United States Patent [19]
Bible

[11] Patent Number: 5,329,725
[45] Date of Patent: Jul. 19, 1994

[54] BUG LIGHT AND BAG APPARATUS
[76] Inventor: Donald W. Bible, Rte. 2, Box 226, Wartburg, Tenn. 37887
[21] Appl. No.: 72,072
[22] Filed: Jun. 7, 1993
[51] Int. Cl.$^5$ ............................................. A01M 1/08
[52] U.S. Cl. ...................................... 43/113; 43/139
[58] Field of Search .................................. 43/113, 139

[56] References Cited

U.S. PATENT DOCUMENTS

| | | | |
|---|---|---|---|
| 1,807,550 | 5/1931 | Rector | 43/139 |
| 2,931,127 | 4/1960 | Mayo | 43/113 |
| 3,120,075 | 2/1964 | Barnhart | 43/113 |
| 4,282,673 | 8/1981 | Focks | 43/113 |
| 4,788,789 | 12/1988 | Boobar | 43/113 |
| 5,020,270 | 6/1991 | Lo | 43/113 |
| 5,157,865 | 10/1992 | Chang | 43/113 |

FOREIGN PATENT DOCUMENTS 498411  9/1954  Italy ..................................... 43/113

Primary Examiner—Kurt C. Rowan
Attorney, Agent, or Firm—E. Michael Combs

[57] ABSTRACT

An air transmissible bag member is mounted coaxially aligned relative to a bug light assembly at a lowermost end thereof to receive bug members dispelled from the bug light assembly and directed into the bag by way of interposed fan assembly between the bug light assembly and the bag.

1 Claim, 4 Drawing Sheets

BUG LIGHT AND BAG APPARATUS

BACKGROUND OF THE INVENTION

1. Field of the Invention

The field of the invention relates to bug light apparatus, and more particularly pertains to a new and improved bug light and bag apparatus arranged to provide for a receiver bag relative to a bug light assembly.

2. Description of the Prior Art

Bug light structure of various types is indicated in the prior art and exemplified by U.S. Pat. Nos. 4,873,786; 4,754,570; and 4,631,858.

The instant invention attempts to overcome deficiencies of the prior art by providing for a bug light and bag apparatus directed to the ease of accumulation of bug members dispelled by the bug light apparatus and in this respect, the present invention substantially fulfills this need.

SUMMARY OF THE INVENTION

In view of the foregoing disadvantages inherent in the known types of bug light structure now present in the prior art, the present invention provides a bug light and bag apparatus wherein the same includes a capture bag mounted to a lowermost end of the bug light structure. As such, the general purpose of the present invention, which will be described subsequently in greater detail, is to provide a new and improved bug light and bag apparatus which has all the advantages of the prior art bug light apparatus and none of the disadvantages.

To attain this, the present invention provides an air transmissible bag member mounted coaxially aligned relative to a bug light assembly at a lowermost end thereof to receive bug members dispelled from the bug light assembly and directed into the bag by way of interposed fan assembly between the bug light assembly and the bag.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bug light and bag apparatus which has all the advantages of the prior art bug light apparatus and none of the disadvantages.

It is another object of the present invention to provide a new and improved bug light and bag apparatus which may be easily and efficiently manufactured and marketed.

It is a further object of the present invention to provide a new and improved bug light and bag apparatus which is of a durable and reliable construction.

An even further object of the present invention is to provide a new and improved bug light and bag apparatus which is susceptible of a low cost of manufacture with regard to both materials and labor, and which accordingly is then susceptible of low prices of sale to the consuming public, thereby making such bug light and bag apparatus economically available to the buying public.

Still yet another object of the present invention is to provide a new and improved bug light and bag apparatus which provides in the apparatuses and methods of the the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
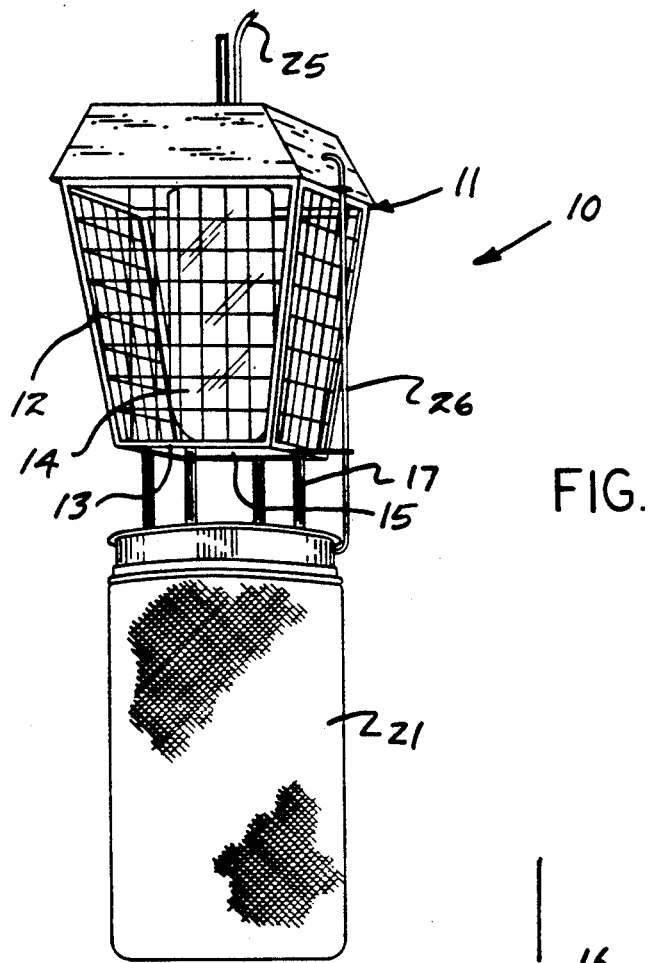
FIG. 1 is an isometric illustration of the invention.
Figure 2:
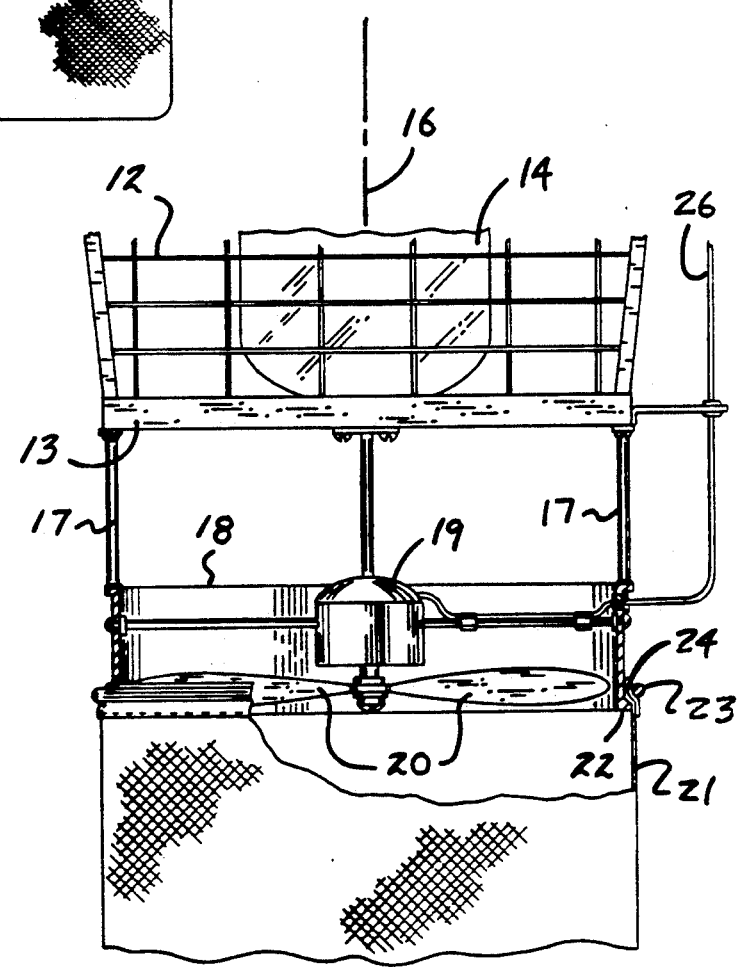
FIG. 2 is an enlarged orthographic view, partially in section, of the fan motor oriented relative to the bug light assembly and the underlying bag.
Figure 3:
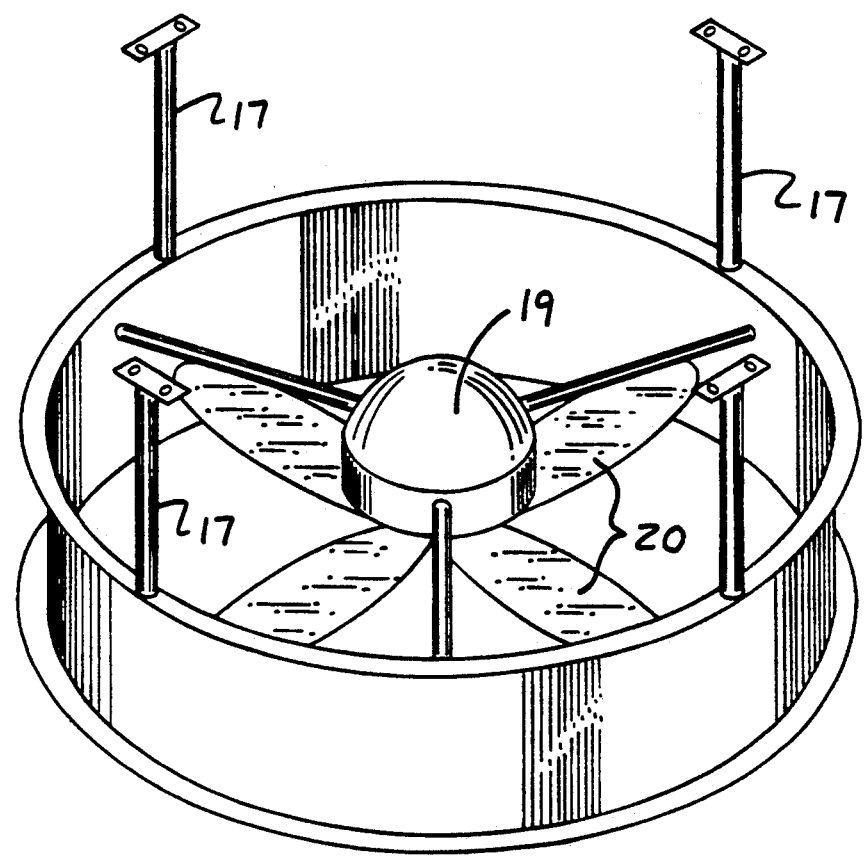
FIG. 3 is an isometric illustration of the mounting framework of the fan assembly.
Figure 4:
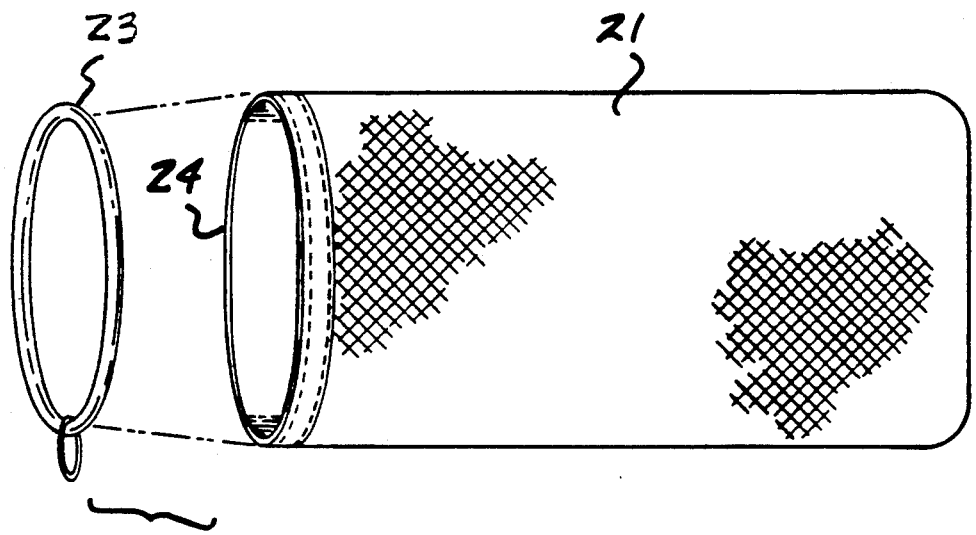
FIG. 4 is an isometric illustration of the bag member.

With reference now to the drawings, and in particular to FIGS. 1 to 8 thereof, a new and improved bug light and bag apparatus embodying the principles and concepts of the present invention and generally designated by the reference numeral 10 will be described.

More specifically, the bug light and bag apparatus 10 of the instant invention essentially comprises a bug light assembly 11, having a mesh body frame 12 coaxially aligned about an axis 16, with a lower perimeter frame 13, and a bug light member 14 mounted within the mesh body frame 12, of a type available in the prior art per se and exemplified by U.S. Pat. No. 4,873,786. The lower perimeter frame 13 includes a lower frame opening 15 coaxially oriented about the housing axle 16, with support legs 17 extending fixedly from the lower perimeter frame 13 parallel to the axis 16 mounting fixedly a cylindrical fan mounting frame 18 to the support leg 17 in a spaced parallel relationship relative to the lower perimeter frame 13. The cylindrical mounting frame 18 is also symmetrically oriented about the housing axis 16, as is a fan member including a fan motor 19 fixedly mounted within the cylindrical fan mounting frame 18. The fan motor 19 includes a plurality of fan blades 20 to direct and project debris, such as dead bugs and the like into an underlying air transmissible cylindrical bag member 21, having a bag entrance end secured to the fan mounting frame 18 of a cylindrical construction. An annular flange 22 projects from a lower distal end of the fan mounting frame 18, and providing for an annular "O" ring groove 28 directed into the fan mounting frame 18 in adjacency to its lower distal end to receive a resilient "O" ring 23 therewithin capturing the bag adjacent the bag entrance end 24 within the groove 28. A power supply line 25 is directed to the bug light assembly 11, and a fan motor electric supply line 26 directed from the power supply line 25 directing electrical energy to the fan motor 19 concurrently with the bug light member 14.

Figure 5:
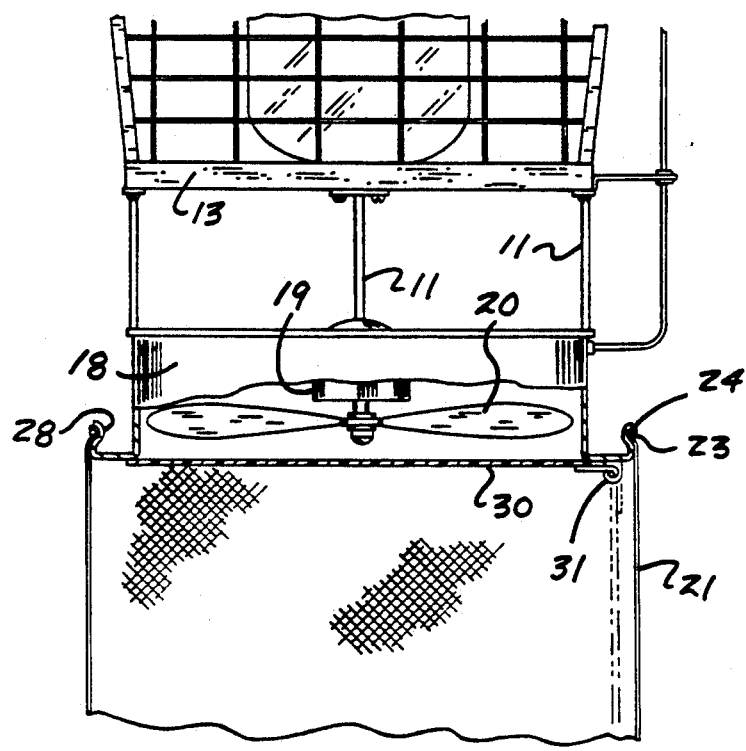
FIG. 5 is an isometric illustration of the bag member including a capture door.
Figure 6:
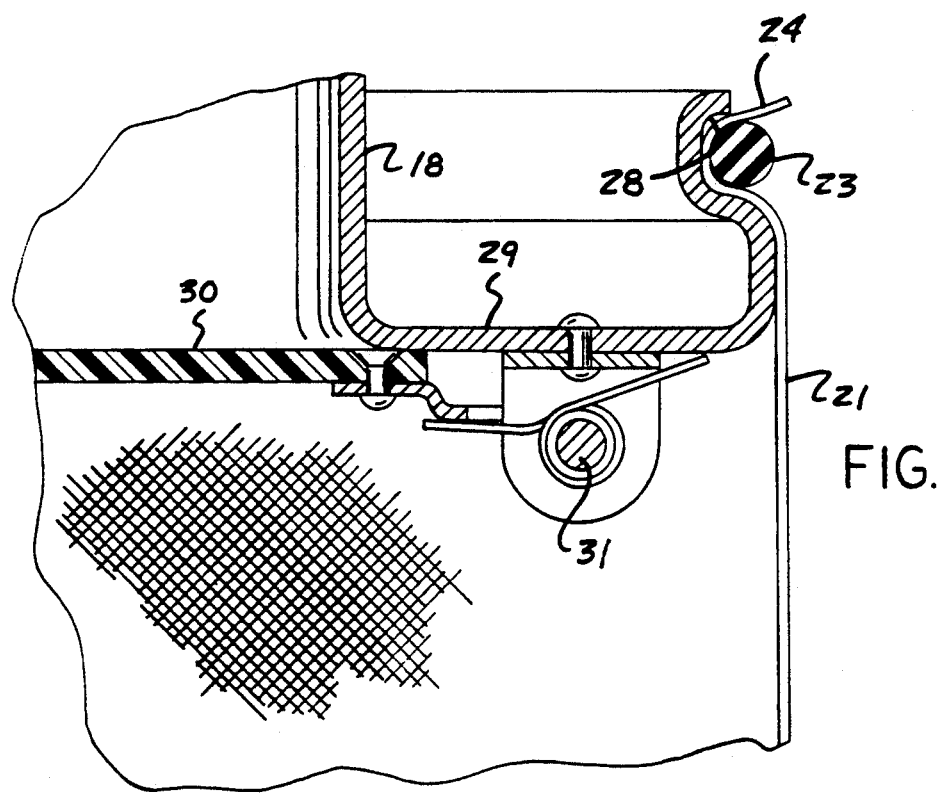
FIG. 6 is an enlarged orthographic view of the spring hinge structure of the capture door.

The FIGS. 5 and 6 indicates the optional employment of a door plate 30 hingedly mounted to an annular mounting flange 29 projecting radially beyond the cylindrical fan mounting frame 18, with the annular mounting flange 29 mounting thereto a spring hinge 31 that in turn biases the door plate 30 into contiguous communication with the annular mounting flange 29, whereupon actuation of the fan motor 19 effects rotation of the blades 20 directing pressurized air onto the door plate 30 to displace the door plate to direct the bugs and debris into the bag member 21.

Figure 7:
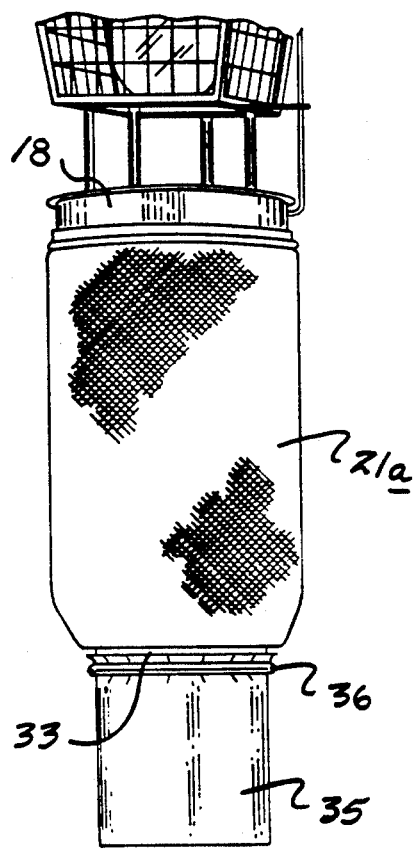
FIG. 7 is an isometric illustration of the bag member including an accessory bag.
Figure 8:
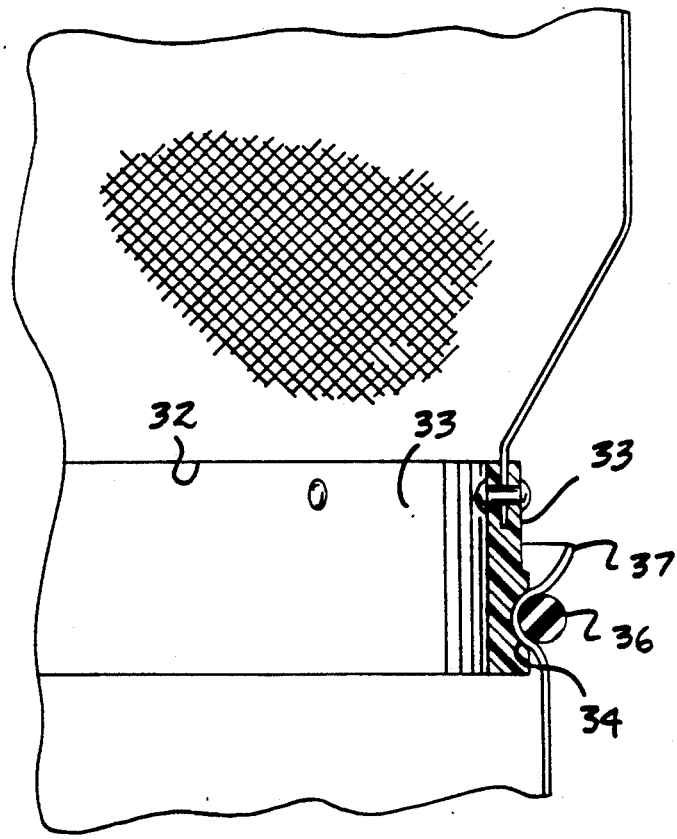
FIG. 8 is an enlarged cross-sectional illustration of the capture bag mounted to the bag member.

A modified bag structure 21a is indicated in FIGS. 7 and 8 include, in addition to the door plate structure as indicated in the FIGS. 5 and 6, a bag exit opening 32 at a lowermost end of the bag 21a coaxially aligned with the axis 16a, such that a bag cylindrical housing 33 is mounted to the bag exit opening 32 provided with a cylindrical housing annular groove 34 to receive an accessory bag resilient "O" ring 36 therewithin to secure air impermeable accessory bag 35 to the cylindrical housing annular groove 34, with the accessory bag 35 having an accessory bag entrance end 37 mounted about the cylindrical housing 33. In this manner, the accessory bag 35 is disposable and thereby permits the modified bag 21a to be secured in an undisturbed manner to the cylindrical fan mounting frame 18 for extended periods of time without requiring its contents to be emptied as such contents are thereby directed into the accessory bag 35 for disposal as a unit.

As to the manner of usage and operation of the instant invention, the same should be apparent from the above disclosure, and accordingly no further discussion relative relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bug light and bag apparatus, comprising,
   a bug light assembly having a mesh body frame, the mesh body frame including a lower perimeter frame member, with the mesh body frame and lower perimeter frame member coaxially aligned about a predetermined axis, and
   the lower perimeter frame member including a lower frame opening, and
   a plurality of support legs extending from the lower perimeter frame member about the lower frame opening, with the support legs parallel to the axis, and a cylindrical fan mounting frame fixedly mounted to the support legs spaced from the lower perimeter frame member, with the cylindrical fan mounting frame coaxially aligned about the axis, with the fan mounting frame having a fan member mounted medially thereof, including fan blades, with an air transmissible bag member mounted to the cylindrical fan mounting frame, with the bag member coaxially aligned relative to the axis, and
   the cylindrical fan mounting frame including an annular mounting flange, the annular mounting flange projecting radially and exteriorly of the fan mounting frame orthogonally relative to the axis, and the annular flange further including an "O" ring groove, and the bag member including a bag entrance end, and a resilient "O" ring, wherein the bag member is captured between the "O" ring and the "O" ring groove in adjacency to the bag entrance end, and
   the annular mounting flange includes a door plate biased coextensively over the annular mounting flange, with a spring hinge mounting the door plate to the annular mounting flange and biasing the door plate in communication with the annular mounting flange, whereupon actuation of the fan motor displaces the door plate relative to the annular mounting flange, and
   the bag member includes a bag exit opening coaxially aligned relative to the axis at a spaced relationship relative to the annular mounting flange, with the bag exit opening including a cylindrical housing mounted thereto, with the cylindrical housing including a cylindrical housing annular groove, and an air impermeable accessory bag mounted to the cylindrical housing, with the accessory bag having an accessory bag entrance end positioned over the cylindrical housing annular groove, with a resilient accessory bag "O" ring mounted onto the cylindrical housing annular groove capturing the accessory bag between the accessory bag "O" ring and the cylindrical housing annular groove.

* * * * *